Jan. 17, 1961     V. BONITO ET AL     2,968,096

WIRE STRIPPING TOOL

Filed Feb. 29, 1960

VINCENT BONITO

VINCENT FERLANTI

INVENTORS

BY *J. O. St Palley*
    *Patent Agent*

United States Patent Office 2,968,096
Patented Jan. 17, 1961

2,968,096

WIRE STRIPPING TOOL

Vincent Bonito, 101 Meloy Road, West Haven, Conn., and Vincent Peter Ferlanti, 56 Palm St., Bridgeport, Conn.

Filed Feb. 29, 1960, Ser. No. 11,826

2 Claims. (Cl. 30—91)

The present invention relates to new and useful improvements in wire stripping tools and is directed more particularly to tools used for dressing the ends of the various types of insulated wires and cables used in the art preparatory to their connection into the electrical and electronic circuits.

In the wiring of the electrical and electronic devices the following operations are necessary prior to making the electric connection. The first step is to cut off the required length of wire or cable from the roll or spool. Following this, in coaxial cables the outer braided conductor must be split and the inner conductor's insulation removed. In plural conductor cables the outer sheath is removed adjacent to the end of the cable and the individual strands stripped from their insulation. Similar stripping operation is necessary for twin and single conductor cables or wires. Finally, the bare conductor must be frequently cut to the exact length required. These operations require three kinds of cuts: cross cuts through the full cross section of the wire or cable, peripheral or circular cuts around the cable or wire to a predetermined depth, and longitudinal cuts or slits alongside the wire or cable to a predetermined depth.

The principal object of the present invention is to provide a tool which can perform all the above mentioned operations efficiently, accurately, and with the minimum effort of the operator.

Another important object of the present invention is to provide a versatile stripping tool which, due to its accurate and quick adjustments and easily interchangeable elements, can handle all the various types and sizes of wires and cables used in the electrical and electronic devices and can be easily and quickly adapted to the particular wires and cables used in any specific application.

A further object of the present invention is to provide a stripping tool which is simple in construction and can be manufactured at a moderate cost.

Other objects and advantages of the present invention will be apparent during the course of the following description.

Figure 1:
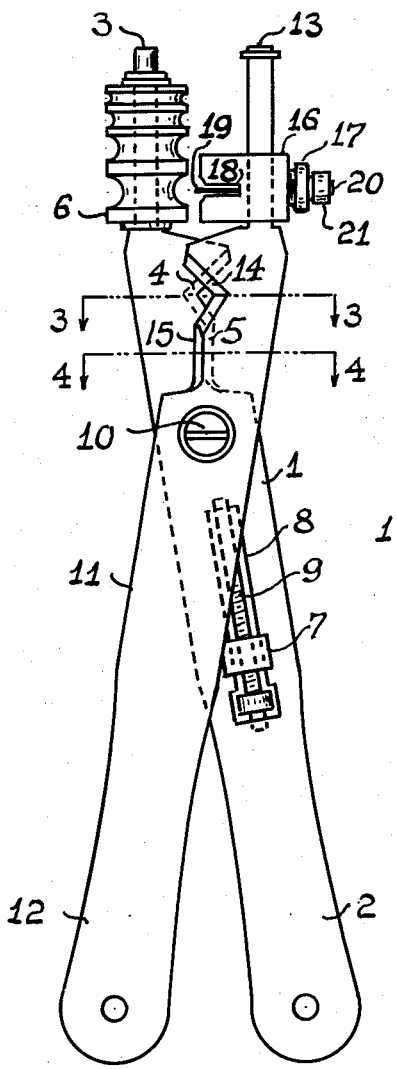
Figure 2:
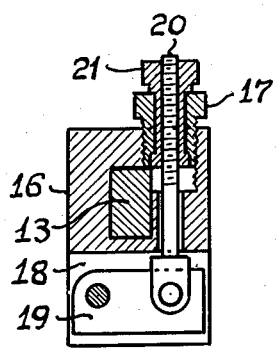
Figures 3, 4:
Figure 5:
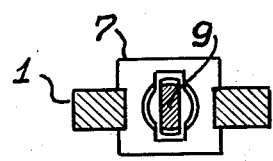

In the accompanying drawing, forming a part of this application, wherein for the purpose of illustration is shown a preferred embodiment of the present invention, Figure 1 is a side elevational view of the preferred form of our stripping tool, Figure 2 is an enlarged sectional view through the cutter block on the line 2—2 of Fig. 1, showing the adjusting mechanism of the cutter blade, Figure 3 is a sectional view on the line 3—3 of Figure 1 through the cutting notches used for making circular cuts, Figure 4 is a sectional view through the radial cutting edges used for making through cuts, Figure 5 is an enlarged sectional view on the line 5—5 of Fig. 1, showing the stop block and the quick adjusting mechanism limiting the angle of the closing of the pivoted arms.

It will be understood that changes and alterations are contemplated and may be made in these exemplifying drawings and mechanical structures, within the scope of the claims, without departing from the principles of the invention.

Referring to the drawing, Fig. 1 shows a side elevational view of our tool, which is of the plier type, comprising a pair of pivotally connected arms, the roller arm 1 and the cutter arm 11, connected by the pivot 10, preferably made of steel. The lower end of each arm is formed as a handle, designated by 2 and 12 respectively. The upper end of the roller arm 1 is reduced in width to form the roller stud 3; similarly the upper end of the cutter arm 11 is reduced in width to form the cutter stud 13. Between these studs and the pivot 10 the two arms are provided with opposing cutting notches, 4 and 14, respectively, used for making circular cuts around the periphery of the insulating layer or sheath of the cable or wire. Adjacent to these cutting notches the arms are provided with opposing straight radial cutting edges, marked 5 and 15, respectively, used for making through cuts of the conductors.

In the preferred form of our invention illustrated the studs 3 and 13 and the handles 2 and 12 are integral with the respective arms, and they have identical outlines; these are very important features from the standpoint of the economy of the manufacturing of our tool as they permit the production of these parts at a low cost by means of a single blanking die. In alternative forms of the present invention, however, these studs and handles may be produced as separate pieces joined to the arms by any method known in the art.

Rotatably mounted on the roller stud 3 is the guide roller 6 used for guiding the wire or cable when making longitudinal cuts in the outer layer. This guide roller is provided with a multiplicity of peripheral grooves of semicircular cross section, so dimensioned as to fit the various wires and cables used in the wiring work of a specific installation or device. This guide roller 6 can be easily removed and replaced by another roller of different size grooves in case of a change in the wire sizes to be worked on.

Mounted on the cutter stud 13 is the cutter block 16, having a slot 18 containing the cutter blade 19. The slot 18 is disposed at right angle to the plane of the arms 1 and 11 facing the guide roller 6, and the cutter block is slidable on the cutter stud 13 permitting the shifting of the cutter block 16 so that the slot 18 and the blade 19 will face the center of any of the groove selected. The set screw 17 serves to lock the cutter block 16 in position.

The construction of the cutter block 16 is shown more in detail in the enlarged sectional view given in Fig. 2. This sectional view was made at right angle to the cutter stud 13 and in the plane of the cutter blade 19. The set screw 17 is threadedly mounted in the cutter block 16, so that when the set screw is tightened, its lower end presses against the top of the cutter stud 13, thereby preventing the sliding of the cutter block 16 on the cutter stud 13. The cutter blade 19 is pivotally secured to the cutter block at one end, and it is pivotally connected at the other end to the blade adjusting bolt 20, which extends through, and engages, the adjusting nut 21. This blade adjusting nut 21 is rotatably mounted within the set screw 17, so that, by turning the adjusting nut 21 the outward projection of the blade 19, consequently, the depth of the cut caused by the blade, can be regulated. It is to be noted that the loosening of the set screw 17 will automatically withdraw the cutter blade 19 into the slot 18, which serves for the protection of the sharp blade when not in use, and constitutes an advantageous feature of our invention.

A very important element of the present invention is the stop block 7 and its novel adjusting mechanism, which permits the convenient and practically instantaneous adjustment of the angle of closing of the arms to any desired minimum value. As seen in Fig. 1, the arm 1 has, adjacent to the handle 2, a longitudinal slot 8, in which slidably mounted is the stop block 7. Passing through this stop block 7 is the adjusting screw 9, which is rotatably mounted on the arm 1. The mechanical connection between this stop block and adjusting screw is illustrated in the enlarged sectional view of Fig. 5. The stop block 7 has a central hole, which is provided with thread, interrupted by two opposing gaps; the adjusting screw 9 has a flat cross section with opposing portions of the periphery threaded, the width of these threaded portions of the screw periphery being less than the width of said gaps in the hole of the stop block 7. As a result of this construction, when the adjusting screw is in the position shown in Fig. 5 the screw 9 permits the free sliding of the stop block 7 to any of its positions. When, however, the adjusting screw 9 is turned its thread will engage the interrupted thread of the hole of the stop block 7 and will lock the stop block in the particular position.

In the preferred embodiment of our invention illustrated the stop block and its adjusting mechanism is mounted on the roller arm 1; in alternative embodiments these may be mounted on the cutter arm 11 with equal effectiveness.

In the dressing of the end portion of the various types of insulated electrical conductors our tool is operated in the following manner:

In case of a single conductor cable or wire the first step is to cut off the required length from the supply. This is accomplished by the cutting edges 5 and 15, with the stop block 7 moved to its lowest position in order to give to the edges 5 and 15 the necessary overlap, as illustrated in Fig. 4. The next step is to make a circular cut around the insulation of the conductor to a specified depth, which is accomplished by the cutting notches 4 and 14. For this purpose the adjusting screw 9 is turned into the free position, shown in Fig. 5, and the stop block 7 is shifted upward, causing the increase of the angle between the arms 1 and 11, until the minimum free opening between the cutting notches 4 and 14 corresponds to the required stripped cross section of the conductor. Then, by a quarter turn of the adjusting screw 9 the stop block 7 is locked in this position. With this setting up the circular cut of the insulating layer is accomplished by placing the insulated conductor between the cutting notches 4 and 14 and rotating same with pressure applied on the arms at the handles 2 and 12. The third step is the splitting of the insulation of the end portion of the conductor longitudinally. For this purpose the insulated conductor is placed in the corresponding groove of the guide roller 6, the cutter block 16 is shifted opposite the selected groove and the arms 1 and 11 are closed until the cutter block 16 lightly contacts the insulated conductor disposed in the groove of the guide roller 6. Then the stop block is moved up until it contacts the arm 11 and, by a quarter turn of the adjusting screw 9 the stop block 7 is locked in this position. Following this, by turning the set screw 17 the cutter block 16 is locked in position, and by turning the adjusting nut 21 the blade 19 is adjusted to the required cutting depth. Then the slitting of the insulation is performed by pulling the insulated conductor through the opening between the cutter block 16 and the groove of the guide roller 6, with the arms 1 and 11 held in the closed position as limited by the stop block 7.

The same method is used for dressing insulated multiconductor cables, with the difference, that here the outer insulating layer is stripped by a circular cut and a longitudinal slit, after which the individual insulated wires of the cable are dressed as described above. In coaxial cables the outer layer or sheath may contain braided conductors, requring stronger blade for its slitting. In some twin conductor wires the two strands are side by side so that their splitting and separation requires guide roller with extra wide groove. Due to the easy exchangeability of the cutter block and the guide rollers our tool can be adapted and will perform very efficiently in the dressing of all types of insulated conductors, and due to the instantaneous adjustability of the stop block our tool will prove to be a very effective time saver as compared with the customary tools used in the art for this work.

It is to be understood that the embodiment of our invention herein described and illustrated is only a preferred example of the same, and that various changes in the shape, size, and arrangement of parts may be resorted to, without departing from the spirit of our invention or from the scope of the subjoined claims.

We claim:

1. A tool for stripping insulation from electrical conductors, comprising a pair of pivotally connected arms, each terminating in a handle at one end and in a stud at the other end; a guide roller, having a multiplicity of peripheral grooves of various predetermined widths and depths, rotatably mounted on the stud of one of said arms, said grooves being perpendicular to the plane of said arms; a cutter block slidably mounted on the stud of the other arm, said cutter block being provided with a slot facing the guide roller and disposed perpendicularly to the plane of said arms; a cutter blade mounted within said slot with one end pivotally secured to the said cutter block; a set screw threadedly mounted in said cutter block preventing the sliding of the cutter block when tightened; a blade adjusting nut coaxially rotatably mounted within said set screw; a blade adjusting bolt threadedly engaging the said blade adjusting nut and is pivotally connected to the other end of the said cutter blade; a stop block slidably mounted on one of the said arms limiting the angle of the closing of the arms to predetermined minimum values depending on the position of the said stop block, said stop block being provided with a hole coaxial with its sliding motion, having threads interrupted by opposing gaps; an adjusting screw of flat cross section, rotatably mounted on the said arm and passing through said stop block, having threads on opposing portions of its periphery, engaging the threaded hole of said stop block in one position of said adjusting screw, and permitting the free sliding of said stop block in other position of said adjusting screw.

2. In a tool for stripping insulation from electrical conductors, having a pair of pivoted arms, the combination comprising a rotatable multigrooved guide roller mounted on the end of one of said arms and having its axis of rotation in the plane of the said pair of arms; a cutter block mounted on the corresponding end of the other arm and having a slot facing said guide roller, said cutter block being slidable permitting the shifting of the cutter block so that the slot can face any selected groove of the guide roller; a set screw threadedly mounted in said cutter block preventing its sliding when said set screw is tightened; a cutter blade mounted within said slot and having one end pivotally secured to said cutter block; a blade adjusting bolt pivotally connected to the other end of the said cutter blade; a blade adjusting nut rotatably mounted within said set screw and threadedly connected to said blade adjusting bolt; a stop block slidably mounted on one of said arms limiting the angle of the closing of the arms to predetermined minimum values depending on the position of the said stop block, said stop block being provided with a hole coaxial with its sliding motion, having threads interrupted by opposing gaps; an adjusting screw of flat cross section, rotatably mounted on the said arm and passing through the hole of said stop block, having threads on opposing portions of its periphery, engaging the threaded hole of the stop block in one position of the adjusting screw, and permitting the free sliding of the stop block in other position of the adjusting screw.

References Cited in the file of this patent

UNITED STATES PATENTS

| | | |
|---|---|---|
| 1,717,725 | McGill | July 18, 1929 |
| 2,300,087 | Anello | Oct. 27, 1942 |
| 2,589,471 | Ayers et al. | Mar. 18, 1952 |
| 2,721,383 | Miller | Oct. 25, 1955 |
| 2,760,390 | Ayer | Aug. 20, 1956 |

FOREIGN PATENTS

| | | |
|---|---|---|
| 525,691 | Great Britain | Sept. 3, 1940 |
| 792,605 | Great Britain | Apr. 2, 1958 |